3,079,382
PROCESS FOR THE SYNTHESIS OF 4-METHYL-17-ALPHA - HYDROXYPROGESTERONE AND ITS ESTERS
Bruno Camerino, Milan, Umberto Valcavi, Varese, Domenico Cattapan, Milan, and Bianca Patelli, Stradella, Italy, assignors to Societa Farmaceutici Italia, a corporation of Italy
No Drawing. Filed Apr. 14, 1959, Ser. No. 806,224
Claims priority, application Great Britain Apr. 16, 1958
8 Claims. (Cl. 260—239.55)

The present invention relates to 4-methyl-17-alpha-hydroxyprogesterones and esters thereof, and a process for the synthesis of such compounds.

These new compounds have been found to display a progestative activity which is at least equal to that of progesterone when applied percutaneously and superior to that of 17-alpha-acetoxy-progesterone and 17-alpha-ethynyl-testosterone when applied per os.

The invention provides 4-methyl-17-alpha-hydroxyprogesterones and esters thereof having the general formula:

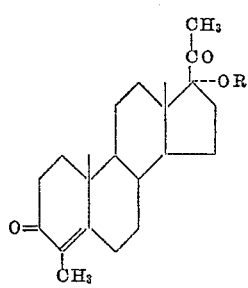

in which R represents a hydrogen atom or an acyl radical derived from an aliphatic carboxylic acid containing not more than 9 carbon atoms.

Particular compounds provided by the invention are 4-methyl-17-alpha-hydroxyprogesterone and 4-methyl-17-alpha-acetoxy-progesterone.

The compounds provided by the present invention may be prepared by a process illustrated by the following scheme:

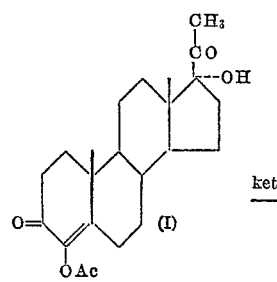

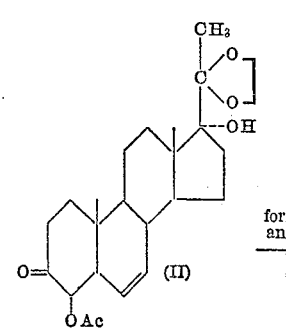

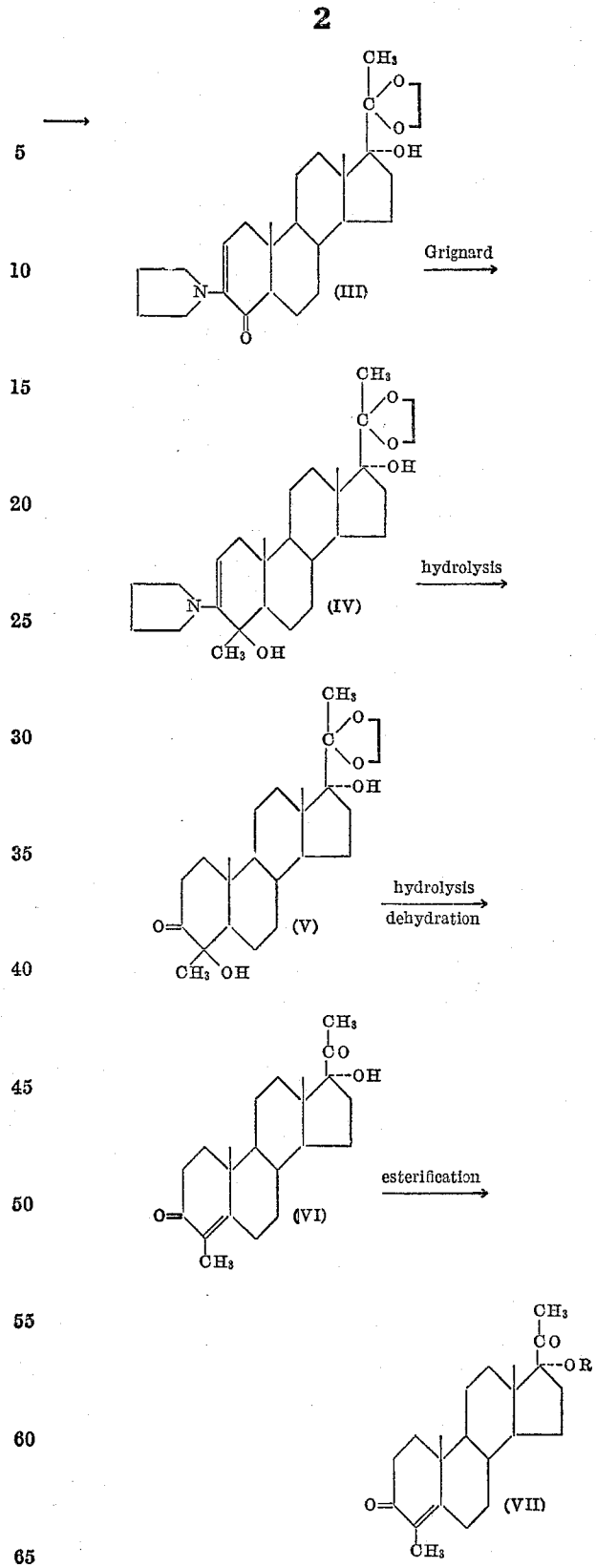

Thus, they may be prepared starting from 4,17-alpha-dihydroxyprogesterone-4-acetate (I) (which may be prepared by the method described in the specification of copending Camerino et al. application Serial No. 781,945, filed December 22, 1958, now U.S. Patent No. 3,030,390) which is treated with an excess of ethylene glycol in enzene at the boiling point in the presence of p-toluene-sulfonic acid to give the 20-mono-ethylene-ketal (II). It is surprising that the 3,20-bis-ethylene-ketal is not formed but only the 20-mono-ethylene-ketal.

The ketal (II) is then treated in the warm with pyrrolidine in methanol and the buteneimine is formed, hydrolysis of the acetic ester in position 4 taking place simultaneously to give 3-(N-pyrrolidinyl)-delta-2-pregnen-17-alpha-ol-4,20-dione-20-ethylene-ketal (III). The 3-pyrrolidone derivative (III) reacts in two tautomeric forms (enolic and ketonic) as follows:

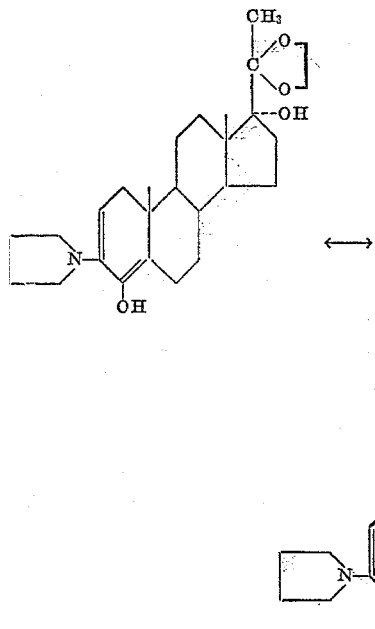

The 3-pyrrolidone derivative (III) is then reacted with a Grignard reagent (CH$_3$MgI) and the buteneimine (IV) is obtained. This, without purification is hydrolyzed in position 3 by boiling it with a buffer solution consisting of acetic acid and potassium acetate to obtain 4-methyl-pregnan-4,17-alpha-diol-3,20-dione-20-ethylene-ketal (V). This compound (V) is treated with warm concentrated hydrochloric acid in methanol in order to selectively dehydrate the hydroxyl group in position 4 without removing that in position 17 and simultaneously the 20-mono-ethylene-ketal is hydrolyzed to give 4-methyl-17-alpha-hydroxyprogesterone (VI).

The esters may be obtained by esterification with the anhydride or chloride of an aliphatic carboxylic acid containing not more than 9 carbon atoms in the presence of p-toluene-sulfonic acid.

The following examples are given to illustrate the present invention.

EXAMPLE 1

*4,17-Alpha-Dihydroxyprogesterone-4-Acetate-20-Ethylene-Ketal (II)*

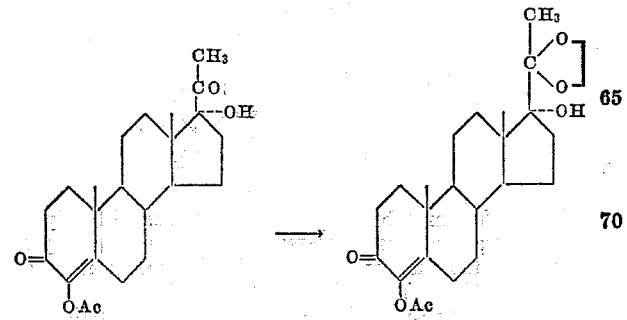

2.5 g. 4,17-alpha-dihydroxyprogesterone-4-acetate are reacted in 75 cc. anhydrous benzene with 20 cc. ethylene glycol and 75 mg. p-toluene-sulfonic acid monohydrate: 75 cc. benzene are distilled off; 75 cc. benzene are added, the solution is refluxed for 5 hours, cooled, washed with water, with an aqueous 10% NaHCO$_3$ solution and finally with water until neutral, then it is dried and evaporated under vacuum to dryness.

The residue is crystallized from methanol thus obtaining 1.2 g. 4,17-alpha-dihydroxyprogesterone-4-acetate-20-ethylene-ketal having a melting point of 213–215° C., $\epsilon_{247}=13,400$. The mother liquor is evaporated to dryness and treated with 80 cc. aqueous 90% acetic acid solution for 20 minutes on a water bath; it is then poured into 200 cc. aqueous 10% Na$_2$CO$_3$ solution and filtered; after crystallization from aqueous methanol 1.2 g. starting product are recovered.

EXAMPLE 2

*3-(N-Pyrolidinyl)-Delta-2-Pregnen-17-Alpha-Ol-4,20-Dione-20-Ethylene-Ketal (III)*

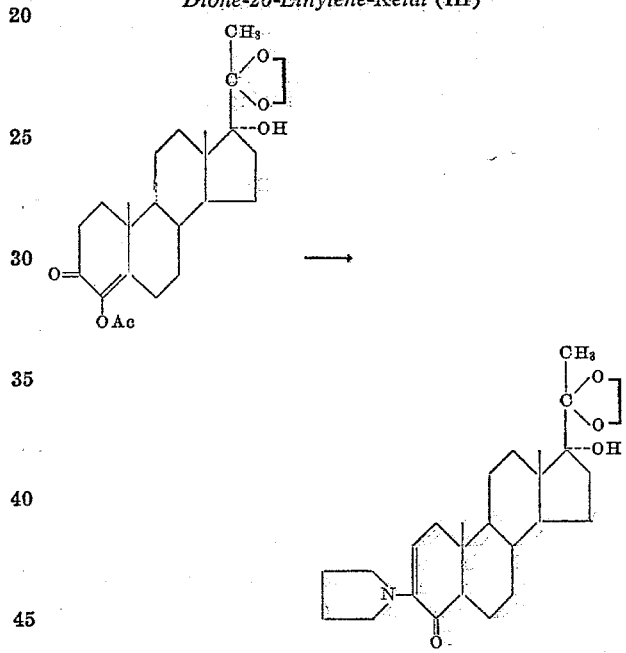

1.2 g. 4,17-alpha-dihydroxyprogesterone-4-acetate-20-ethylene-ketal are dissolved in 100 cc. warm methanol under nitrogen; 1.6 cc. pyrrolidine are added to the solution and the mixture is refluxed for 2 hours. A further 0.8 cc. pyrrolidine are then added and the whole is refluxed again for 30 minutes. After cooling with an ice-salt mixture the product is filtered; 650 mg of a product having a melting point of 215–220° C. are obtained. By concentration of the mother liquor a further 350 mg. 3-(N-pyrrolidinyl)-delta-2-pregnen-17-alpha-ol-4,20-dione-20-ethylene-ketal, having a melting point of 212–217° C., are recovered.

EXAMPLE 3

*4-Methyl-Pregnan-4,17-Alpha-Diol-3,20-Dione-20-Ethylene-Ketal (V)*

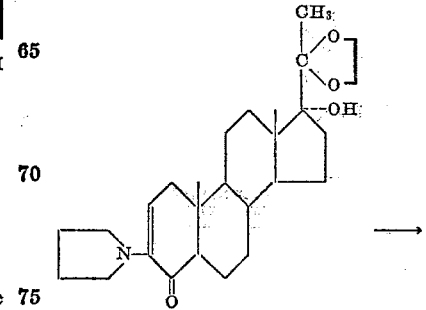

1 hour, methanol is evaporated under vacuum and the solution is diluted with water and filtered, thus obtaining 130 mg. of a product melting at 163–170° C. By recrystallization from methanol, 80 mg. 4-methyl-17-alpha-acetoxyprogesterone, melting point 170–174° C., $\epsilon_{250}=13,500$, are obtained.

From the biological comparison between 4-methyl-17-alpha-acetoxyprogesterone and 17-alpha-ethynyltestosterone the following results are obtained:

TABLE I

| Steroid | dose, mg. | Method of administration | Proliferation degree according to McPhail |
|---|---|---|---|
| 17-alpha-ethynyltestosterone | 5 | per os | 1.8 |
| Do | 10 | do | 2.8 |
| 4-methyl - 17 - alpha - acetoxyprogesterone | 1 | do | 2.7 |
| Do | 0.5 | do | 1.8 |

TABLE II

[Relative power of 4-methyl-17-alpha-acetoxyprogesterone in comparison with 17-alpha-ethynyltestosterone, both per os]

17-alpha-ethynyltestosterone _____ 1
4-methyl-17-alpha-acetoxyprogesterone _____ 10

TABLE III

[Progestative activity of 4-methyl-17-alpha-acetoxyprogesterone per os]

| Steroid | dose, mg. | Method of administration | Proliferation degree according to McPhail |
|---|---|---|---|
| Progesterone | 0.5 | subcutaneous | 4 |
| Do | 1 | do | 2.4 |
| 17-alpha-acetoxyprogesterone | 1 | per os | 0.57 |
| Do | 2 | do | 2.1 |
| Do | 5 | do | 3.1 |
| 4-methyl - 17 - alpha - acetoxyprogesterone | 0.5 | do | 1.8 |
| Do | 1 | do | 2.7 |

TABLE IV

[Relative power of 4-methyl-17-alpha-acetoxyprogesterone per os in comparison with that of progesterone by subcutaneous application]

Progesterone _____ 1
4-methyl-17-alpha-acetoxyprogesterone _____ 0.61
17-alpha-acetoxyprogesterone _____ 0.17

TABLE V

[Relative power of 4-methyl-17-alpha-acetoxyprogesterone in comparison with that of 17-alpha-acetoxyprogesterone, both per os]

17-alpha-acetoxyprogesterone _____ 1
4-methyl-17-alpha-acetoxyprogesterone _____ 3.5

The preparation of 4,17-alpha-dihydroxy-progesterone, and of the corresponding 4-acetate, is described in the copending application of Camerino et al., Serial No. 781,945, filed December 22, 1958, as follows:

24 cc. 4 N sodium hydroxide and 40 cc. 130-vol. hydrogen peroxide are added to 12 g. 17-alpha-acetoxy-progesterone dissolved in 1.6 liters methanol and cooled to 15° C. The whole is kept in a refrigerator at +5° C. for 1 hour.

26.4 cc. glacial acetic acid are then added, the mixture is poured into 8 liters water and the precipitate, consisting of a mixture of 4,5-beta- and 4,5-alpha-epoxy-17-alpha-acetoxyprogesterone having a melting point of 193–202° C., is filtered. The ultraviolet spectra of the product do not show any absorption at between 220 and 300 mμ, and elementary analysis gives the following results:

Found, percent: C, 71.12; H, 8.41. For $C_{23}H_{32}O_5$, calculated, percent: C, 71.10; H, 8.31.

The chemical structure of the compound, which is obtained with a yield of 90%, is demonstrated by the fact that it gives again the starting compound, 17-alpha-acetoxyprogesterone, when heated with KI for 10 minutes in acetic acid.

A solution of 6.7 cc. concentrated sulfuric acid in 28 cc. glacial acetic acid (pure for analysis) is added to 13.2 g. raw 4,5-epoxy-17-alpha-acetoxyprogesterone dissolved in 66 cc. glacial acetic acid (pure for analysis). This mixture is left to stand overnight at room temperature and is then poured into 200 g. ice, while stirring and filtered while washing with water until the filtrate is neutral.

12.5 g. of a product having a melting point of 160–172° C. are obtained. By recrystallization from diluted methanol the melting point rises to 197–200° C.; $\epsilon_{278}=12,500$; it gives a blue color with a FeCl$_3$ solution.

Found, percent: C, 70.90; H, 8.54. For $C_{23}H_{32}O_5$, calculated, percent: C, 71.10; H, 8.31.

A solution of 1 g. potassium carbonate in 16 cc. water is added to 1 g. 4-hydroxy-17-alpha-acetoxyprogesterone dissolved in 100 cc. methanol. The mixture is refluxed for 1 hour and then kept at room temperature; thereafter, it is diluted with water and filtered; 0.8 g. 4,17-alpha-dihydroxyprogesterone with a melting point of 110–170° C. is obtained, which after double crystallization from methanol, appears as crystals having a melting point of 229–231° C.; $\epsilon_{278}$ is 11,800; it assumes a blue color when treated with a FeCl$_3$ solution.

Found, percent: C, 72.43; H, 8.95. For $C_{21}H_{30}O_4$, calculated, percent: C, 72.80; H, 8.73.

3.2 g. 4,17-alpha-dihydroxy-progesterone, dissolved in 25 cc. pyridine, are acetylated with 3.5 cc. acetic anhydride at room temperature for 20 hours. This mixture is then poured into 100 g. ice and filtered; the precipitate is washed with water until the filtrate is neutral.

3.4 g. 4-acetoxy-17-alpha-hydroxy-progesterone, with a melting point of 190–195° C. are obtained. By recrystallization from diluted methanol a product having a melting point of 195–198° C., $\epsilon_{246}=15,400$, is obtained.

Found, percent: C, 71.13; H, 8.45. For $C_{23}H_{32}O_5$, calculated, percent: C, 71.10; H, 8.30.

As indicated above, the acylation of the 4-hydroxy group by means of other esterifying agents, such as caproic anhydride, oenanthic anhydride, and cyclopentylpropionic anhydride, proceeds analogously to the preparation of the 4-acetate in Example 5 above. The therapeutic application of the corresponding 4-esters, and others, in the same manner as described for the 4-acetate is within the scope of this disclosure.

The term "aliphatic," as used herein, is inclusive of cycloaliphatic.

We claim:

1. A process for making a 4-methyl-17-alpha-acyloxy-progesterone having the following general formula:

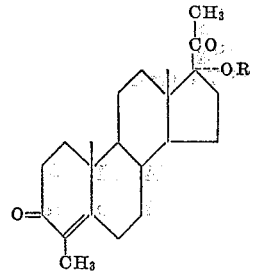

where R is the radical of an aliphatic carboxylic acid containing not more than 9 carbon atoms, comprising subjecting 4,17 - alpha - dihydroxyprogesterone-4-acetate to mono-ketalization, in the 20-position, by reaction with ethylene glycol in the presence of para-toluene-sulfonic acid to obtain the corresponding mono-20-ethylene-ketal, treating the latter with pyrrolidine in warm methanol to make the 3-pyrrolidine derivative, subjecting the latter to a Grignard's reaction with methyl magnesium iodide and then treating with potassium acetate in aqueous acetic acid to obtain 4-methylpregnan-4,17-alpha-diol-3,20-dione-20-

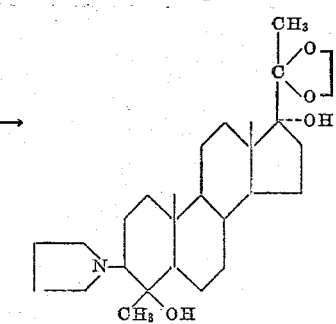

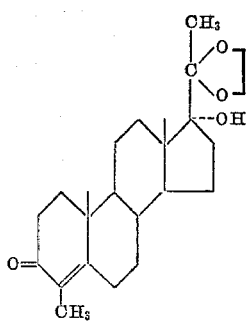

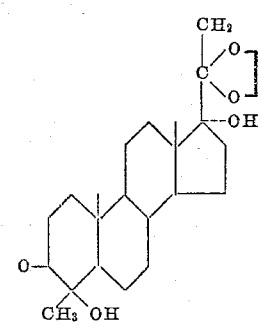

A Grignard reagent prepared from 5.5 g. Mg, 14.6 cc. $CH_3I$ and 40 cc. anhydrous ether, is added to a solution of 1.25 g. 3-(N-pyrrolidinyl)-delta-2-pregnen-17-alpha-ol-4,20-dione-20-ethylene-ketal in 160 cc. anhydrous benzene at room temperature while stirring. The mixture is refluxed for 6 hours and then kept at room temperature overnight; the product is decomposed by treatment with 60 cc. water, while cooling with an ice-salt mixture, and neutralized with an aqueous 50% $CH_3COOH$ solution. The organic layer is separated, the mother liquor extracted 5 times with 100 cc. benzene, the solvent is then treated with water, with an aqueous 10% $NaHCO_3$ solution again with water, and dried by evaporation under vacuum.

The solid residue weighs 1.2 g.; a sample crystallized from methanol melts at 190–194° C. (transparent to U.V.).

4.7 cc. $H_2O$, 2.1 cc. $CH_3COOH$ and 2.1 g. $CH_3COOK$ are added to 1.2 g. of this product (i.e. 3-(N-pyrrolidinyl)-4 - methyl - delta-2-pregnen-4,17-alpha-diol-20-one-20-ethylene-ketal) dissolved in 25 cc. methanol. The mixture is refluxed for 3 hours, concentrated under vacuum to a small volume, and diluted with water; by filtration, 1.1 g. 4-methyl-pregnan-4,17-alpha-diol-3,20-dione-20-ethylene-ketal having a melting point of 191–196° C. (transparent to U.V.) are recovered.

EXAMPLE 4

*4-Methyl-17-Alpha-Hydroxyprogesterone* (VI)

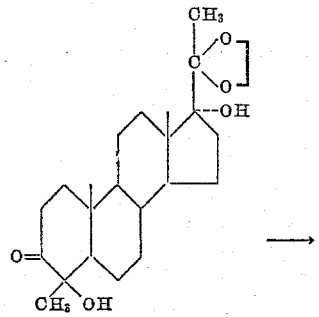

7.5 cc. concentrated hydrochloric acid are added to 1.1 g. 4-methyl-pregnan-4,17-alpha-diol-3,20-dione-20-ethylene-ketal dissolved in 75 cc. methanol; the mixture is refluxed for 3 hours and then concentrated under vacuum to a very small volume; it is then washed again with water and filtered; after crystallization from methanol 130 mg. 4-methyl-17-alpha-hydroxy-progesterone having a melting point of 224–232° C. are obtained. A sample recrystallized melts at 238–240° C; $\epsilon_{251}=14,000$.

EXAMPLE 5

*4-Methyl-17-Alpha-Acetoxyprogesterone* (VII)

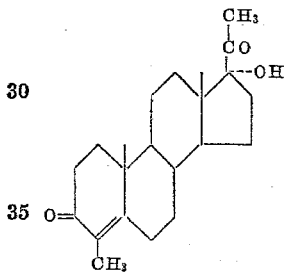

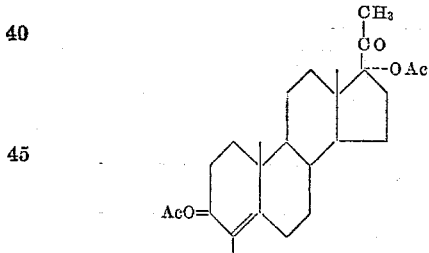

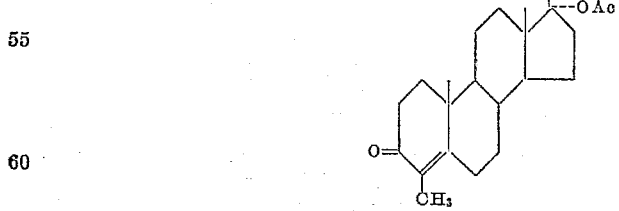

0.32 g. 4-methyl-17-alpha-hydroxyprogesterone having a melting point of 224–232° C. are treated with 3 cc. acetic anhydride and 10 mg. of p-toluene-sulfonic acid monohydrate at 90° C. for 30 minutes; the mixture is kept at room temperature for 3 hours, thus obtaining a crystalline precipitate which is filtered and washed first with 1 cc. acetic anhydride and then with warm water. 250 mg. of a product melting at 235–246° C., $\epsilon_{236}=19,000$ are obtained as white flakes.

0.58 cc. concentrated sulfuric acid and 1.15 cc. water are added to 160 mg. of this product (i.e. 4-methyl-delta-2,4-pregnadiene-3-beta,17-alpha-diol - 20 - one-3,17-diacetate) dissolved in 90 cc. methanol. After refluxing for mono-ethylene-ketal, dehydrating the latter with concentrated hydrochloric acid in methanol, thereby also saponifying the ketal linkage in the 20 position, to obtain 4-methyl-17-alpha-hydroxyprogesterone, esterifying the latter by treating with an agent of the group consisting of the anhydride and chloride of an aliphatic acid having not more than 9 carbon atoms, to obtain a 4-methyl-17-alpha-acyloxy-progesterone.

2. A process for making 4-methyl-17-alpha-hydroxyprogesterone comprising subjecting 4,17-alpha-dihydroxyprogesterone-4-acetate to mono-ketalization, in the 20-position, by reaction with ethylene glycol in the presence of para-toluene-sulfonic acid to obtain the corresponding mono-20-ethylene-ketal, treating the latter with pyrrolidine in warm methanol to make the 3-pyrrolidine derivative, subjecting the latter to a Grignard's reaction with methyl magnesium iodide and then treating with potassium acetate in aqueous acetic acid to obtain 4-methylpregnan-4,17-alpha-diol-3,20-dione-20-mono-ethylene-ketal, dehydrating the latter with concentrated hydrochloric acid in methanol, thereby also saponifying the ketal linkage in the 20 position, to obtain 4-methyl-17-alpha-hydroxyprogesterone.

3. A process comprising subjecting 4-methylpregnan-4,17-alpha-diol-3,20-dione-mono-20-ethylene-ketal to dehydration and saponification by refluxing a mixture thereof with concentrated hydrochloric acid in methanol, to obtain 4-methyl-17-alpha-hydroxyprogesterone.

4. A process comprising subjecting 4-methylpregnan-4,17-alpha-diol-3,20-dione-mono-20-ethylene-ketal to dehydration and saponification by refluxing a mixture thereof with concentrated hydrochloric acid in methanol, to obtain 4-methyl-17-alpha-hydroxyprogesterone, and esterifying the latter by treating with an agent of the group consisting of the anhydride and chloride of an aliphatic acid having not more than nine carbon atoms, to obtain the corresponding 4-methyl-17-alpha-acyloxy-progesterone.

5. A process comprising subjecting 4,17-alpha-hydroxyprogesterone-4-acetate to mono-ketalization by treating it with ethylene glycol in the presence of para-toluene-sulfonic acid, to obtain the corresponding mono-20-ethylene-ketal.

6. A process comprising subjecting 4,17-alpha-hydroxyprogesterone-4-acetate to mono-ketalization by treating it with ethylene glycol and p-toluene-sulfonic acid in anhydrous benzene, distilling off benzene, adding benzene and refluxing, washing with dilute aqueous alkali, and recovering the corresponding mono-20-ethylene-ketal.

7. A process of making a mono-ketal, the 4-methylpregnan-4,17-alpha-diol-3,20-dione-20-ethylene-ketal, comprising refluxing a mixture of 4,17-alpha-hydroxyprogesterone-4-acetate with ethylene glycol and p-toluene sulfonic acid in an organic diluent inert in the reaction.

8. A process of making 4-methyl-17-alpha-hydroxyprogesterone comprising treating 4,17-alpha-dihydroxyprogesterone-4-acetate-20-ethylene-ketal with pyrrolidine in warm methanol to make the 3-pyrrolidine derivative, subjecting the latter to a Grignard's reaction with methyl magnesium iodide and then treating with potassium acetate in aqueous acetic acid to obtain 4-methyl-pregnan-4,17-alpha-diol-3,20-dione-20-mono-ethylene-ketal, dehydrating the latter with concentrated hydrochloric acid in methanol, thereby also saponifying the ketal linkage in the 20-position, to obtain 4-methyl-17-alpha-hydroxyprogesterone.

References Cited in the file of this patent

FOREIGN PATENTS

| | | |
|---|---|---|
| 737,957 | Great Britain | Oct. 5, 1955 |
| 740,114 | Great Britain | Nov. 9, 1955 |